(12) United States Patent
Nobili (10) Patent No.: US 9,068,659 B2
(45) Date of Patent: Jun. 30, 2015

(54) MIXER GROUP FOR BATHROOM OR KITCHEN

(75) Inventor: Fabrizio Nobili, San Vittore (CH)

(73) Assignee: Fabrizio Nobili, San Vittore (CH)

( * ) Notice: Subject to any disclaimer, the term of this patent is extended or adjusted under 35 U.S.C. 154(b) by 797 days.

(21) Appl. No.: 13/288,240

(22) Filed: Nov. 3, 2011

(65) Prior Publication Data

US 2012/0111429 A1    May 10, 2012

(30) Foreign Application Priority Data

Nov. 9, 2010    (EP) .................................... 10190552

(51) Int. Cl.

| | |
|---|---|
| *F16K 3/26* | (2006.01) |
| *F16K 27/04* | (2006.01) |
| *F16K 3/24* | (2006.01) |
| *E03C 1/02* | (2006.01) |
| *E03C 1/05* | (2006.01) |
| *F16K 11/22* | (2006.01) |
| *F16K 31/04* | (2006.01) |

(52) U.S. Cl.
CPC .............. *F16K 3/265* (2013.01); *F16K 27/041* (2013.01); *F16K 3/243* (2013.01); *E03C 1/021* (2013.01); *E03C 1/05* (2013.01); *F16K 3/26* (2013.01); *F16K 11/22* (2013.01); *F16K 31/04* (2013.01)

(58) Field of Classification Search
CPC ........ F16K 27/041; F16K 3/243; F16K 3/265
USPC .............. 137/315.12–315.14, 603, 801, 606, 137/516.29; 251/361, 364, 365, 334, 325
See application file for complete search history.

(56) References Cited

U.S. PATENT DOCUMENTS

| | | | | |
|---|---|---|---|---|
| 2,698,027 A | * | 12/1954 | Branson | 137/504 |
| 3,693,659 A | * | 9/1972 | Parola | 137/625.3 |
| 3,955,796 A | * | 5/1976 | Grove | 251/172 |
| 4,653,535 A | | 3/1987 | Bergmann | |
| 2001/0013553 A1 | | 8/2001 | Chamot et al. | |
| 2006/0273277 A1 | * | 12/2006 | Heller et al. | 251/334 |
| 2009/0148268 A1 | * | 6/2009 | Nobili | 415/10 |

FOREIGN PATENT DOCUMENTS

| | | |
|---|---|---|
| FR | 1586509 | 2/1970 |
| FR | 2463343 | 2/1981 |

OTHER PUBLICATIONS

European Search Report from European Application No. EP 10190552 dated Apr. 5, 2011.

* cited by examiner

*Primary Examiner* — Atif Chaudry
(74) *Attorney, Agent, or Firm* — Dorsey & Whitney LLP (57) ABSTRACT

Embodiments of the present invention refer to a mixer group for bathroom or kitchen comprising a hollow cylinder, a tubular body that forms a seat for the sliding of the hollow cylinder and comprises an axial inlet and at least one radial outlet for the water, and an electric motor for actuating the hollow cylinder. The mixer group comprises a lid for the end opposite the inlet of the tubular body, defining an extension of the sliding seat, and an annular gasket between the tubular body and the lid, comprising an elastically deformable tab that projects into the extension of the seat, in open flow conditions, or is deformed against the hollow cylinder, to close the flow, when the hollow cylinder engages with the extension.

20 Claims, 7 Drawing Sheets

MIXER GROUP FOR BATHROOM OR KITCHEN

CROSS-REFERENCE TO RELATED APPLICATIONS

This application claims priority to European Patent Application No. 10190552.9 filed on 9 Nov. 2010, the contents of which are incorporated herein, in their entirety, by this reference.

TECHNICAL FIELD

Embodiments of the present invention relate to a mixer group for bathroom or kitchen comprising electronic water flow adjustment means. In particular, embodiments of the present invention relate to a mixer group of the aforementioned type in which it is also possible to control the temperature of the water. Even more in particular, embodiments of the invention relate to a mixer group for controlling electronically the flow rate and the temperature with much more precision than manual control.

BACKGROUND

Mixer groups for bathroom or kitchen are known that allow an electronic adjustment of the flow rate and of the water temperature.

Such mixer groups comprise hot and cold water inlets, an outlet of mixed water, a pair of valves situated downstream of the respective inlets, motorised means for actuating the respective valves, electrically driven by an electronic card that is inserted in a hydraulically insulated seat of the mixer group itself. In particular, the adjustment of the flow rate is carried out through a keypad mounted, for example, on the sink plane or on the diffuser jet and electrically connected to the electronic card of the mixer group.

Such mixer groups make it possible to have an electronic control of the flow rate and of the temperature that is much more precise than a manual control and that are aesthetically more pleasing, due to the fact that they can adapt to upper end bathrooms and kitchens. Indeed, the control keypad can be left visible on the sink plane or it can be mounted on the diffuser jet, whereas the mixer group that carries out the adjustment of the water can be situated below the sink or in a hidden area.

However, the aforementioned mixer groups suffer from some limitations, mainly associated with their dimensions, and from some drawbacks relative to their maintenance requirements and to their operation.

As far as the dimensions are concerned, the coupling of the electric motors and of the valves is rather bulky, since that the electric motors are each equipped with their own rotation shaft fixedly attached to a corresponding gear which engages with a second gear mounted on a stem of the respective valve. In order to allow each electric motor to precisely adjust the opening of the relative valve, it is foreseen for there to be a transmission or reduction ratio between the gears, obtained by using a first gear for the electric motor and a second gear for the valve having a different diameter; such gears have a considerable bulk.

Moreover, in known mixer groups, seats are foreseen for receiving the valves that are in fluid communication with the inlets, to receive water. Such valves are big and contain discs made from ceramic for intercepting fluid, which are able to adjust the flow rate of the water according to the angular movement of their stem and have dimensions of about 3 cm diameter and a length of about 5 cm, including the length of the gear that projects from the body of the valve to be engaged by the gear of the electric motor.

Due to the aforementioned arrangement of the motors, of the valves, of the reduction gears and of the electronic card, as well as to the dimensions of the valves, of the motors and of the gears themselves, the mixer group is rather bulky and cannot always be inserted in the limited space available below the sink. Moreover, when the mixer group can be inserted, its installation substantially occupies a lot of the available space below the sink.

Of course, the mixer group can be installed in view, for example on the sink plane or at the edge of the tub, but in such a case it has an undesired bulk and, in any case, it is not very nice to look at.

On the other hand, it has been found that the gears of the motor and of the valves undergo wearing that tends to alter the adjustment precision of the mixer group, unless periodic and onerous maintenance operations are carried out that foresee extracting the mixer group from its housing, accessing the mechanical components, substantially removing a cover of the mixer group, cleaning and oiling the gears, as well as checking the correct position of the valves and the operation of the electric motors.

Finally, in known mixer groups, it has been verified that the electronic adjustment of the valves is rather noisy, due to the movement of the gears, and generates an annoying whistling noise, probably due to the flow of water inside the ceramic valves, which in some cases prevents it from being used in homes.

The problem forming the basis of at least some of the embodiments of the present invention is that of conceiving a mixer group for bathroom or kitchen with very small dimensions, suitable for being inserted in a small area beneath the sink or wash basin, without having an annoying bulk, whilst still being equipped with mechanical means for actuating the valves that are capable of adjusting the temperature and the flow rate in a particularly precise manner, without requiring substantial maintenance interventions over time and that is very silent. Another purpose of at least some of the embodiments of the invention is that of making it unnecessary to extract the mixer group once it has been installed, substantially overcoming the limitations and the drawbacks that still affect mixer groups according to the prior art.

SUMMARY

The idea for a solution forming the basis of one or more embodiments of the present invention is that of using at least one water inlet of a mixer group (e.g., the hot water inlet) as the axial sliding seat of a valve comprising a hollow cylinder, actuated by a respective spindle of an electric motor, sliding in the inlet. Advantageously, the size of the mixer group is considerably small, since the inlet, which also acts as a fitting with a tube for supplying hot water, is also used as a sliding seat for the valve. Also a second inlet, for example for cold water, can be used as a sliding seat of a second hollow cylinder, actuated by a second electric motor.

Figure 1:
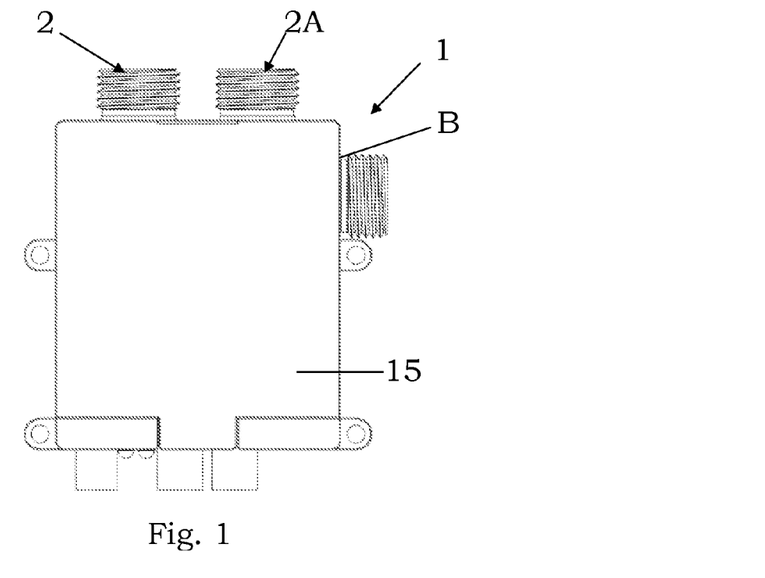
FIG. 1 is a front view of a mixer according to an embodiment of the present invention.
Figure 2:
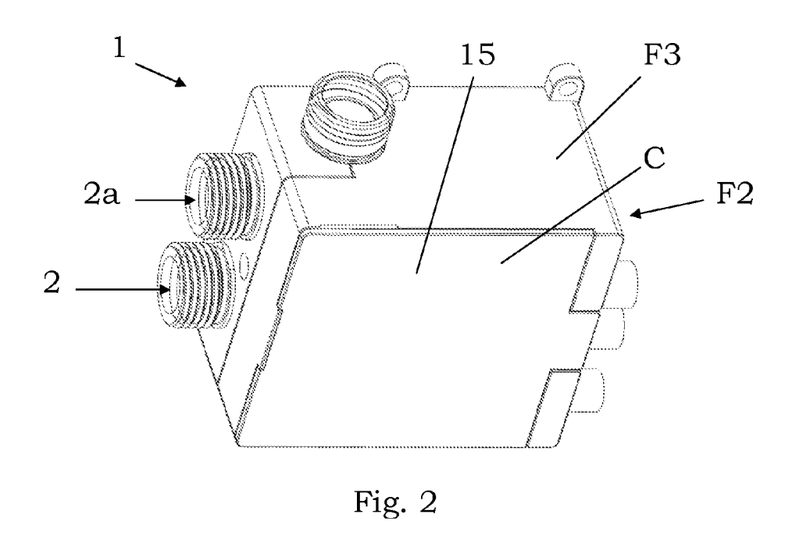
FIG. 2 is a perspective view of the mixer of FIG. 1.
Figure 3:
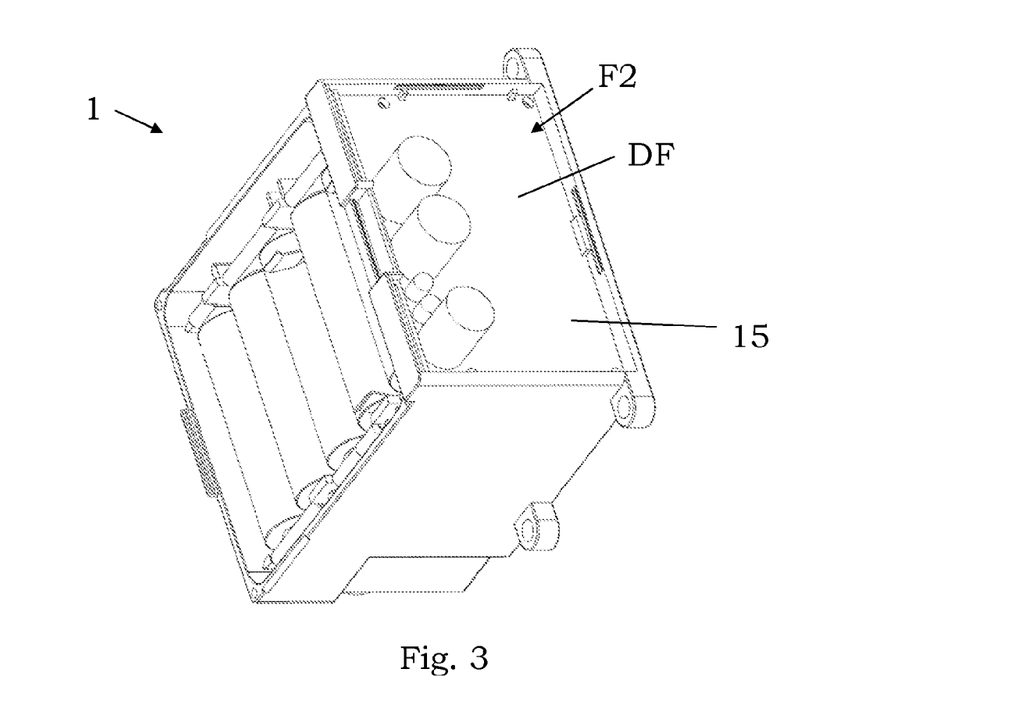
FIG. 3 is a different perspective view of the mixer of FIG. 1.
Figure 4:
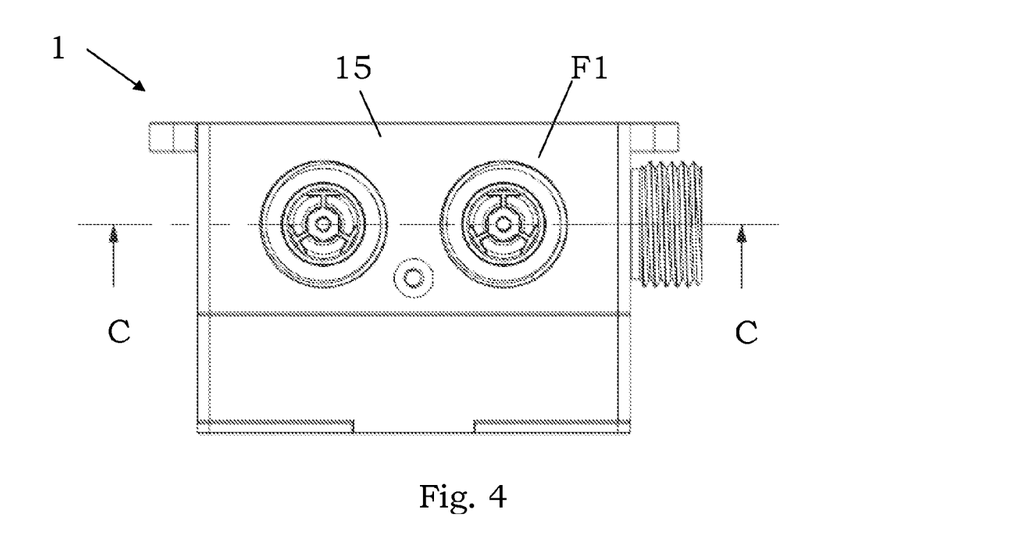
FIG. 4 is a top view of the mixer of FIG. 1.
Figure 5:
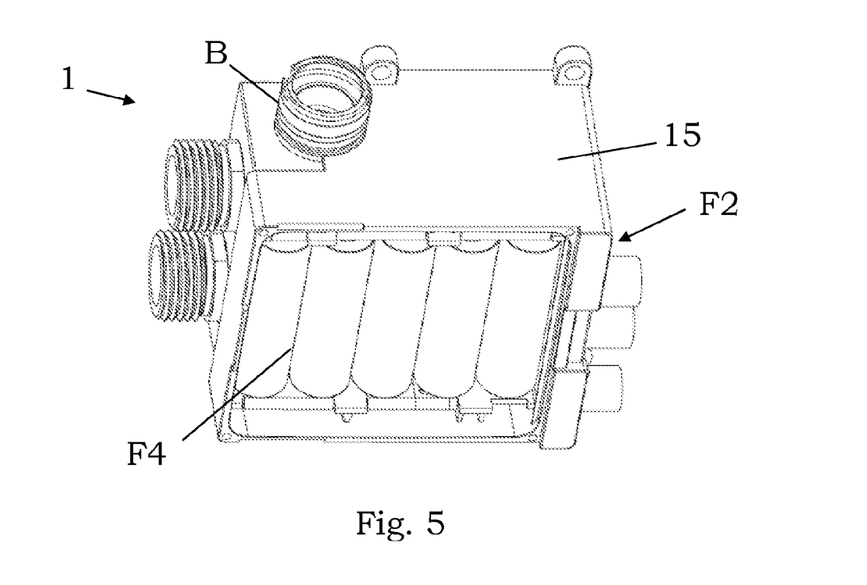
FIGS. 5 and 6 are different perspective views of the mixer of FIG. 1.
Figure 6:
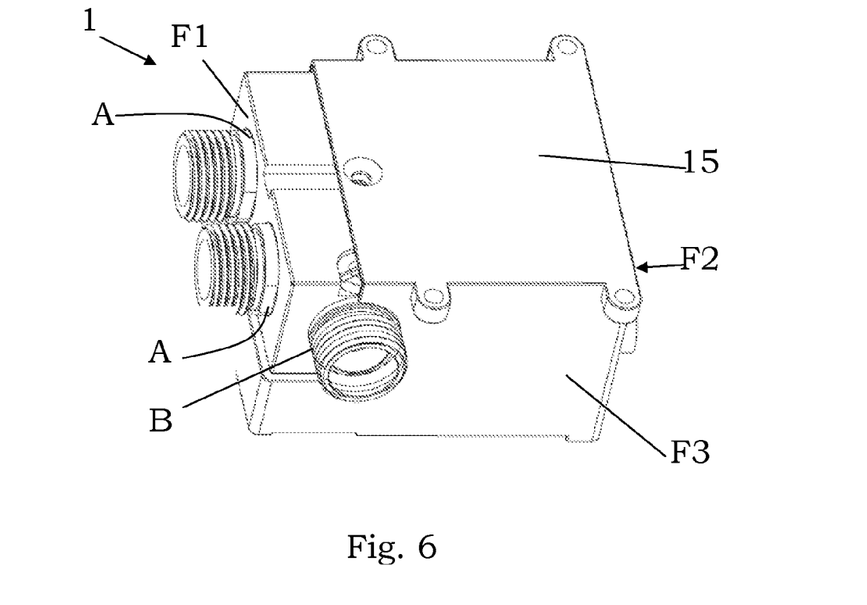
Figure 7:
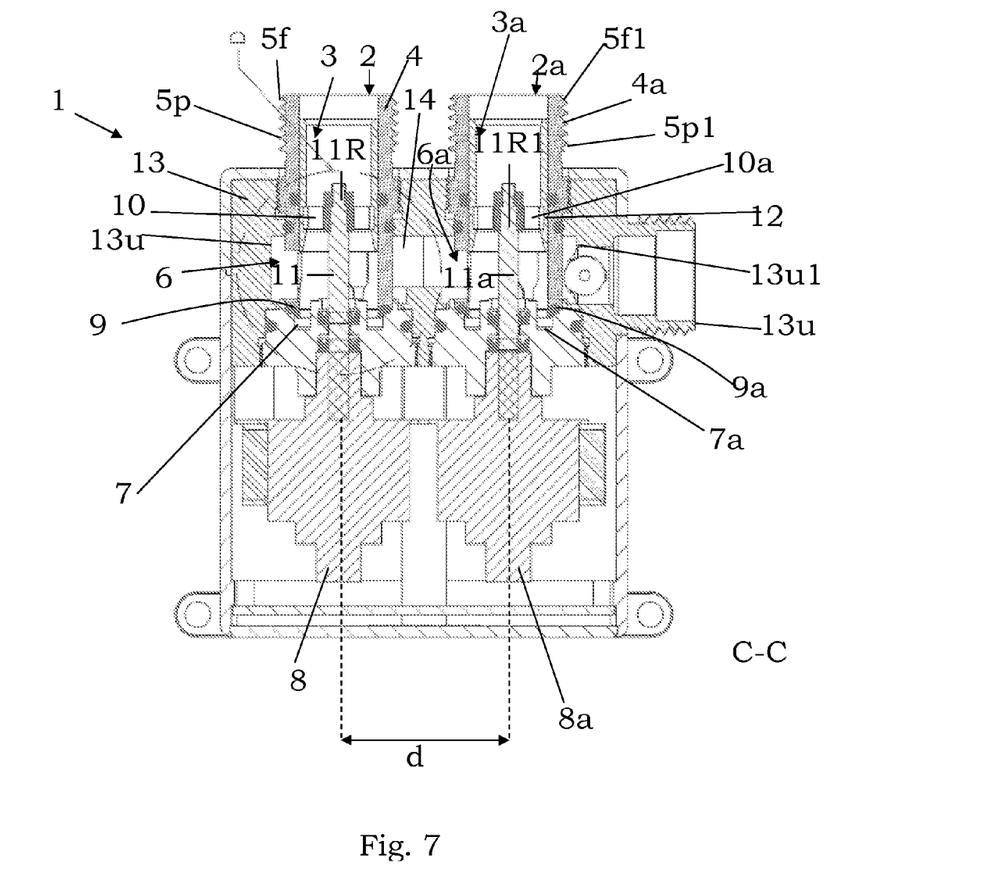
FIG. 7 is a section view of the mixer along the line C-C of FIG. 4, during an operative step.
Figure 7A:
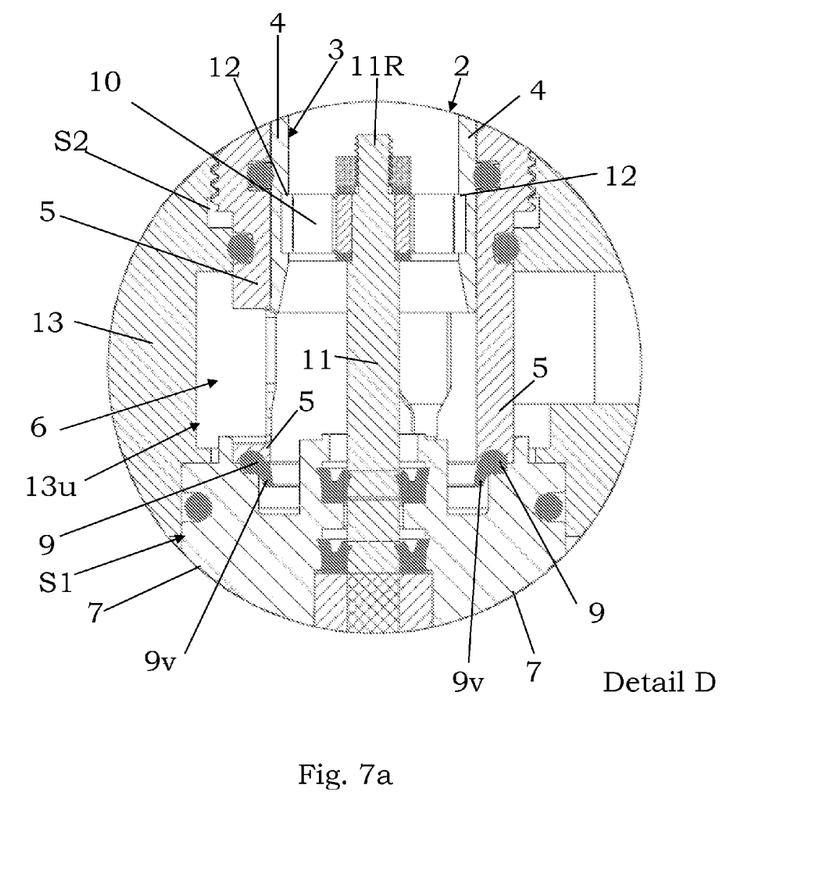
FIG. 7a is a detail of the section of FIG. 7.
Figure 8:
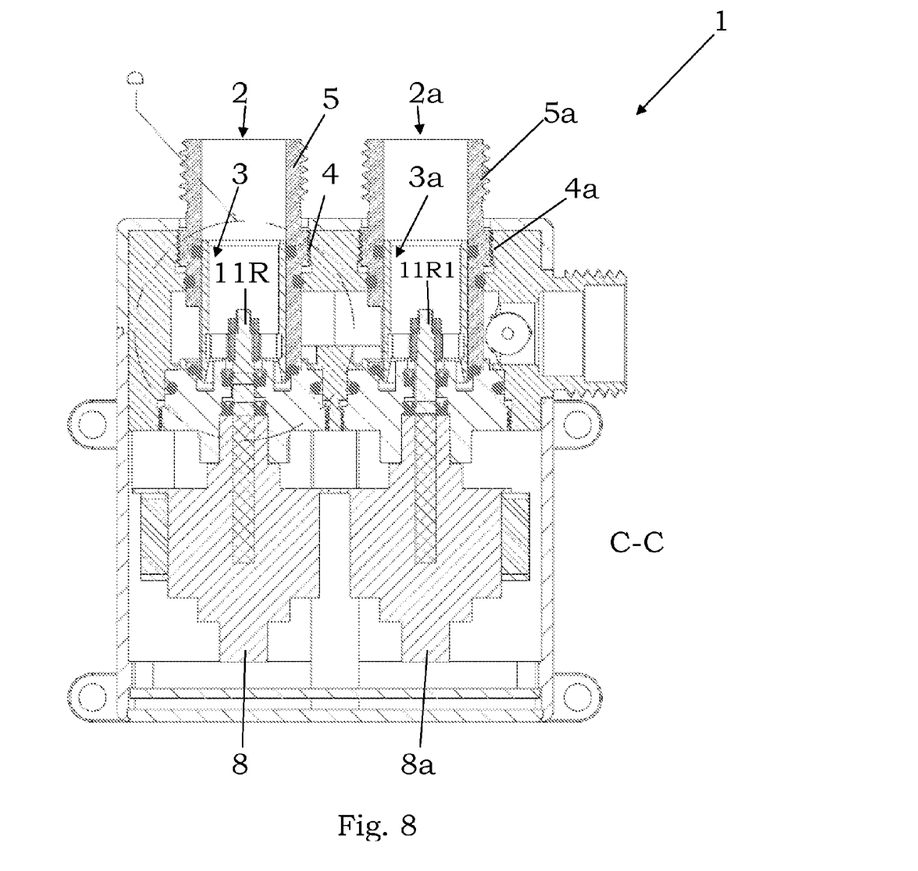
FIG. 8 is a section view of the mixer along the line C-C of FIG. 4, during another operative step.
Figure 8A:
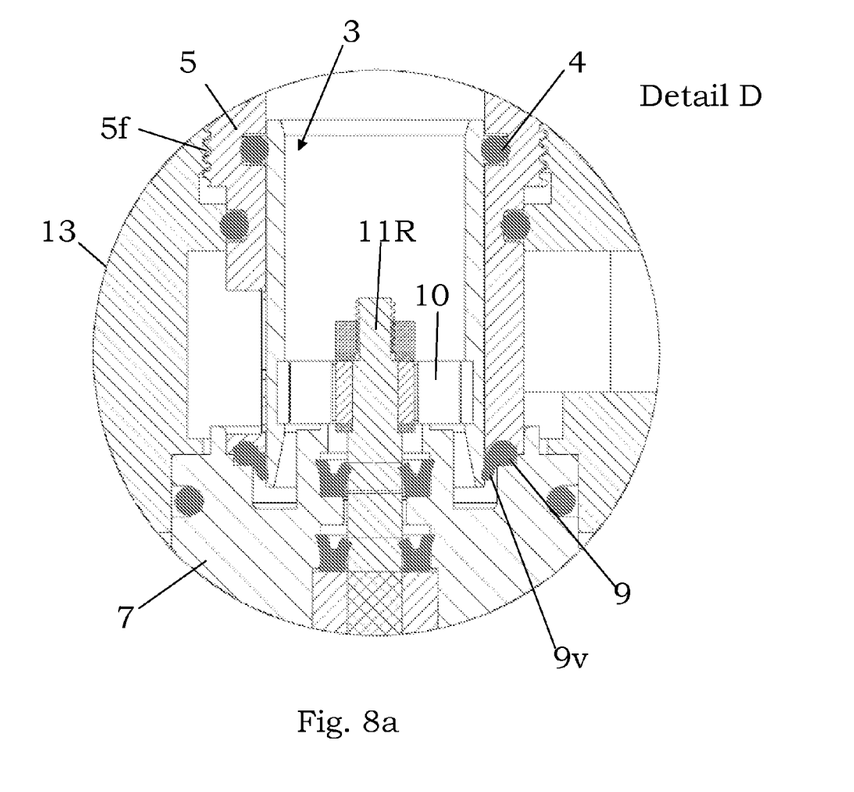
FIG. 8a is a detail of the section of FIG. 8.

Further provisions, which shall become clearer in the rest of the description, combine to considerably reduce the dimensions of the mixer group. Advantageously, the arrangement of the hollow cylinder and of the inlet, which is obtained with a tubular body coaxial to the hollow cylinder, reduces the impact of the water on the valve, considerably decreasing the noise of the mixer group but also decreasing the energy necessary in order to actuate the valve. In particular, as shall become clear from the following description, the pressure exerted by the water in inlet on the valve (from right to left in FIG. 7) is mostly balanced by the pressure of water already present in the mixer (from left to right in FIG. 7); in such a way, it is possible to use electric motors with limited power and dimensions to actuate the hollow cylinder.

Substantially, the hollow cylinder acts as a gate valve with respect to a radial outlet situated on the tubular body, adjusting the outlet flow. The closure is carried out through an elastically deformable gasket, interposed between the tubular body and a lid thereof, opposite the inlet of the water, and that forms an extension of the sliding seat of the hollow cylinder; in particular, the gasket is equipped with a tab or a tongue that projects towards the extension of the sliding seat.

The operation is as follows: when the hollow cylinder closes the radial outlet like a gate valve but without involving the extension of the sliding seat, a small amount of water flows between the tubular body and the hollow cylinder, allowing a very precise adjustment of the water; when the hollow cylinder is positioned in such an extension, it deforms the gasket against the tubular body and carries out the closure.

Preferably, the tab has an inclination of 45° towards the extension of the sliding seat. This configuration is particularly advantageous since, when the hollow cylinder deforms the gasket against the tubular body, the inclination of the tab reduces, for example to 20°, which does not adhere completely to the tubular body, making it possible for the water present in the lid to exert a pressure behind the tab, i.e. between the tubular body and the tab, which compresses the latter towards the cylindrical body, increasing its seal.

Such a gasket has the double function of forming a seal between the lid and the tubular body, in any operation condition, and to form a seal between the tubular body and the hollow cylinder, when the latter is retracted in the extension of the sliding seat.

Moreover, the mechanical members suitable for adjusting the flow, i.e. the hollow cylinder and the motors, do not undergo substantial wearing since the closure of the flow is carried out through deformation of the gasket against the tubular body. In particular, the gasket is not operatively associated with the radial outlet to carry out the closure on it, like in common valves, which would cause abrasion of the gasket against the radial outlet, but it is associated with the cylindrical surface of the hollow cylinder, and therefore does not undergo abrasions. In particular, the tab of the gasket is elastically deformed between the cylindrical surface of the hollow cylinder and the cylindrical surface of the tubular body, between which there is preferably a distance of 0.75 mm; in such a case the thickness of the tab is of between 14 mm (base of the tab) and 13.5 mm (end of the tab).

This solution avoids the requirement of maintenance operations on the mixer group, for the replacement of the gasket or the servicing of complex gears, and at the same time achieves an adjustment of the flow with uncommon precision. Indeed, during the dispensing, the gasket substantially remains stretched out inside the lid, and free from any contact with other structural parts of the mixer that would cause possible abrasions to it.

Advantageously, the size of the mixer group is very small even in the case of adjusting hot and cold water from respective inlets, since respective valves are coupled with the electric motors through spindles, parallel to one another, and without using reduction gears for each motor.

Based upon such a solution, the technical problem forming the basis of one or more embodiments of the present invention is solved with a mixer group for bathroom or kitchen comprising a hollow cylinder, a tubular body that forms a sliding seat of the hollow cylinder and comprises an axial inlet and at least one radial outlet for the water, an electric motor for actuating the hollow cylinder, the mixer group comprising a lid for the end opposite the inlet of the tubular body, defining an extension of the sliding seat, and an annular gasket between the tubular body and lid, comprising an elastically deformable tab that projects in the extension of the seat, in open flow conditions, or is deformed against the hollow cylinder, for closing the flow.

According to one aspect of the present invention, the lid comprises a through hole for the sliding of a shaft of the electric motor and an operative end with a small diameter of the shaft is coupled with a perforated disc, preferably comprising a filter for the water, which engages a thickness of the hollow cylinder. Advantageously, the water filter is compacted inside the valve body formed by the hollow cylinder and by the tubular body, further limiting the dimensions of the mixer group.

According to a preferred embodiment, the perforated disc is made from plastic material, preferably POM, and is coupled at the end with predetermined axial clearance, preferably of 0.02 mm, and predetermined radial clearance, preferably of 0.3 mm. Advantageously, the applicant has observed that the axial clearance and the radial clearance mentioned above prevent the flow of water from generating an annoying noise or whistling sound found in some prototypes in which the perforated disc was substantially fixed on the motor spindle.

According to preferred embodiments, the extension of the sliding seat has a length of 3 mm; the tab has a thickness, when resting, of 0.5 mm and an inclination, when resting, of 45°. Such a structure of the lid and of the tongue allow an adjustment of the flow with unusual precision, i.e. of amounts of water of between 40 and 30,000 ml/min that flow when the gasket is not deformed while closed against the hollow cylinder. These embodiments give the mixer group an excellent capability of dosing the water, for example for filling small containers or phials.

According to another aspect of the present invention, the mixer group comprises a single-body having opposite seats for fixing the lid and the tubular body, and a water outlet in fluid communication with the radial outlet. The applicant has observed that it is advantageous to manufacture the lid and the tubular body separately from the single-body to facilitate the positioning of the elastically deformable gasket and so as to reduce the manufacturing costs.

According to a preferred embodiment, a portion of the inlet projects from the seat of the single-body and forms threaded mounts for fitting respective flexible tubes for supplying hot or cold water; the hollow cylinder is suitable for being at least partially operative projecting from the axial inlet in the flexible tube. In such a way, the dimensions of the mixer group are even smaller, since also the space inside the supply tubes is exploited for the sliding of the hollow cylinder, in particular for opening the flow to its maximum.

Preferably, the tubular body has a cross section, of about 8 mm, and the electric motor generates power which is at least sufficient to move the hollow cylinder under mains pressure comprised between 0 bar and 15 bar, preferably a power comprised between 40 Newton and 100 Newton. The inlet of the water has an inner diameter of about 14 mm and the hollow cylinder has a section of 13.9 mm.

As already mentioned, the mixer group can moreover comprise a second electric motor for actuating a second hollow cylinder, able to slide in a second tubular body, the electric motors being suitable for the adjustment, respectively, of cold and hot water entering in the respective axial inlets, flowing together in a mixing chamber of the mixer group, which is in fluid communication with the radial outlets of the tubular bodies.

In particular, the electric motors are linear actuation electric motors, situated outside the single-body, hydraulically insulated from the mixing chamber and configured to reduce the interaxial distance between the respective spindles, preferably at a distance which is less than or equal to 30 mm. The fact that there are no reduction gears, i.e. the use of a gate valve and of the claimed gasket, makes it possible to solve the technical problem of reducing the dimensions of the mixer, by bringing the two electric motors much closer to one another.

According to another aspect of the present invention, the mixer group comprises a substantially boxed body made from insulating material, comprising the electric motors and the single-body, equipped with a face having respective openings for the inlets, an opposite face and a respective double bottom, between which an electronic card is situated for driving the electric motors, a lateral face equipped with a respective opening for the outlet of the single-body, and a removable cover that is opposite to the lateral access plane to a hydraulically insulated seat for receiving a power supply unit for the electronic card and the electric motors. Advantageously, the mixer group is easy to install since all the functional elements are enclosed in the boxed body that can be easily fixed below, for example the sink, hydraulically connected to the inlet/outlet tubes, and supplied with electricity.

In particular, according to an embodiment, the hydraulically insulated housing seat is preformed for housing the batteries, preferably 5 AAA batteries. The double bottom comprises at least one slot through which electric connections pass between the electronic card and, respectively, the power supply and the electric motors, and one layer of silicon resin for insulating the electronic card to protect it from humidity.

Thanks to the technical and functional characteristics described above, the boxed body has dimensions that are smaller than or equal to 70 mm×80 mm×50 mm.

The mixer group according to at least some of the embodiments of the invention solve the technical problem since the valves are operatively inside the inlets and are mounted directly on the spindles of the respective electric motors, which are side by side and very close to each other, preferably at an interaxial distance that is shorter than or equal to 30 mm, and do not have reduction gears.

The increase and the reduction of the flow rate is carried out through the sliding of the hollow cylinder of the tubular body, respectively increasing or decreasing the port for the water to pass through the radial outlet, and the closure is carried out through the sliding of the hollow cylinder in the extension of such a seat and the deformation of the tab of the gasket against it. In other words, during the closure, the tab does not project in the seat but is squashed against the hollow cylinder; advantageously, in such a position, the water present in the seat compresses the tab against the hollow cylinder, substantially acting upon the surface of the tab which is not in contact with the hollow cylinder, thus increasing the sealing of the gasket and improving the closure. In particular, when the hollow cylinder engages with the extension of the sliding seat, the flow is closed.

Further characteristics and advantages of the embodiments of the present invention shall become clearer from one of its embodiments given only as an example and not for limiting purposes with reference to the attached drawings.

DETAILED DESCRIPTION

With reference to the Figures, a mixer group for bathroom or kitchen according to an embodiment of the present invention is represented with reference numeral 1. The mixer group 1 comprises a hollow cylinder 4, 4a, a tubular body 5, 5a that forms a sliding seat of the hollow cylinder and comprises an axial inlet 2, 2a and at least one radial outlet 6, 6a for the water, and an electric motor 8, 8a for actuating the hollow cylinder 4, 4a. The mixer group also comprises a lid 7, 7a for the end opposite the inlet 2, 2a of the water in the tubular body 5, 5a, defining an extension of the sliding seat for the hollow cylinder 4, 4a, and an annular gasket 9, 9a between the tubular body 5, 5a and lid 7, 7a, comprising an elastically deformable tab 9v that projects in the extension of the seat, in open flow conditions, or deformed against the hollow cylinder 4, 4a, for closing the flow.

The lid 7, 7a comprises a through hole for the sliding of a shaft 11, 11a of the electric motor and an operative end with a small diameter 11R1, 11R of the shaft is coupled with a perforated disc 10, 10a, preferably comprising a water filter, which engages a thickness of the hollow cylinder, as indicated with 12. Advantageously, the water filter is compacted inside the body of the valve 3, 3a formed by the hollow cylinder 4, 4a and by the tubular body 5, 5a, further limiting the dimensions of the mixer group. The perforated disc is made from plastic material and is coupled with the end of the spindle 11, 11a with a predetermined axial clearance. Such a radial and/or axial clearance prevents the water flow from generating an annoying noise or whistling sound found in some prototypes in which the perforated disc was rigidly fixed onto the motor spindle 11R, 11R1.

The extension of the sliding seat formed by the lid 7, 7a has a length of 3 mm; the tab has a thickness, when resting, of 0.5 mm and an inclination, when resting, of 45°.

The mixer group comprises a single-body 13 having opposite fixing seats S1, S2 of the lid 7, 7a and of the tubular body 4, 4a, and a water outlet 13u, 13u1 in fluid communication with the radial outlet 6, 6a. The applicant has observed that it is advantageous to manufacture the lid 7, 7a and the tubular body 5, 5a separately from the single-body so as to allow the positioning of the elastically deformable gasket 9, 9A and so as to reduce the manufacturing costs. According to a preferred embodiment, a portion 5p, 5p1 of the inlet 2, 2a projects from the seat of the single-body 13 and forms threaded mounts 5f, 5f1 for joining a respective flexible tube for supplying hot or cold water.

The mixer group can moreover comprise a second electric motor 8a for actuating a second hollow cylinder 4a, able to slide in a second tubular body 5a, the electric motors 8, 8a being suitable for the adjustment, respectively, of cold and hot water entering in the respective axial inlets 2, 2a, flowing together into the mixing chamber 14 of the mixer group, which is in fluid communication with the radial outlets 6, 6a of the tubular bodies 5, 5a. The electric motors 8, 8a are situated outside the single-body 13, hydraulically insulated from the mixing chamber 14 and configured so as to reduce the interaxial distance d between the respective spindles 11, 11a, preferably at a distance that is smaller than or equal to 30 mm. The fact that there are no reduction gears, i.e. the use of the claimed gate valve 3, 3a and the gasket 9, 9a, makes it possible to synergically solve the technical problem of reducing the dimensions of the mixer, by bringing the two electric motors much closer to each other.

Moreover, it is foreseen for the mixer group to comprise a substantially box-shaped body 15 made from insulating material, comprising the electric motors and the single-body, equipped with a face F1 having respective openings A, A for the inlets, an opposite face F2 and a respective double bottom DF between which an electronic card is situated for driving the electric motors, a lateral face F3 equipped with a respective opening B for the outlet of the single-body, and a removable cover C, associated with a face F4, for the access to a hydraulically insulated seat for receiving a power supply for the electronic card and the electric motors, for example with 5 AA o AAA-type batteries. Advantageously, the mixer group is simple to install since all the functional elements are enclosed in the boxed body 15 that can be easily fixed below the sink, hydraulically connected to the tubes for letting the water in and out, and supplied with electricity. The double bottom DF comprises at least one slot through which electric connections pass between the electronic card and, respectively, the power supply and the electric motors, and a layer of silicon resin for insulating the electronic card to protect it from humidity.

Advantageously, the mixer group according to at least some of the embodiments of the invention solve the technical problem since the valves 3, 3a are operative inside the inlets 2, 2a and are mounted directly onto the spindles 11, 11a of the respective electric motors 8, 8a, which are side by side and very close to one another, preferably at an interaxial distance d that is shorter than or equal to 30 mm, and do not have reduction gears. The increase and the reduction of the flow rate is carried out through the sliding of the hollow cylinder 4, 4a in the tubular body 5, 5a, respectively increasing or decreasing a port for the water to pass through the radial outlet 6, 6a, and the closure is carried out by deforming the tab of the gasket 9, 9a against the hollow cylinder 4, 4a, in the extension of such a seat. In other words, during the closure, the tab is no longer projecting in the seat but is squashed against the hollow cylinder. Advantageously, in such a position, the water present in the seat compresses the tab against the hollow cylinder, substantially acting upon the surface of the tab that is not in contact with the hollow cylinder, thus increasing the seal of the gasket and improving the closure. In such a way, flow rate and temperature adjustments can be carried out in a highly precise manner. Moreover, the valves, i.e. the respective hollow cylinders 4, 4a, the tubular bodies 5, 5a, and the gaskets do not undergo wearing and therefore the mixer does not require maintenance operations.

The invention claimed is:

1. A mixer group for bathroom or kitchen, comprising:
   a hollow cylinder;
   a tubular body that forms a sliding seat of the hollow cylinder, the tubular body including an axial inlet and at least one radial outlet for the water;
   an electric motor configured for actuating the hollow cylinder;
   a lid for an end opposite the axial inlet of the tubular body, defining an extension of the sliding seat;
   a single-body having opposite seats configured for fixing the lid and the tubular body, and a water outlet in fluid communication with the at least one radial outlet; and
   an annular gasket between the tubular body and the lid, the annular gasket comprising an elastically deformable tab that projects in an extension of the sliding seat, in open flow conditions; or is deformed against the hollow cylinder, to close the flow, when the hollow cylinder engages with the extension.

2. The mixer group according to claim 1 wherein the lid comprises a through hole for the sliding of a shaft of the electric motor, and one operative end with a small diameter of the shaft is coupled with a perforated disc comprising a filter for the water, which engages a thickness of the hollow cylinder.

3. The mixer group according to claim 2 wherein the perforated disc is made from plastic material, and is coupled with the one operative end with a predetermined axial clearance and a predetermined radial clearance.

4. The mixer group according to claim 1 wherein the extension has a length of about 3 mm and the tab has a thickness, at rest, of about 0.5 mm and an inclination, at rest, of about 45°, for an adjustment of minimal amounts of water that flow when the annular gasket is not deformed against the hollow cylinder.

5. The mixer group according to claim 1 wherein a portion of the inlet projects from the single-body and forms threaded mounts for fitting a respective flexible tube for supplying hot and cold water.

6. The mixer group according to claim 1 wherein the tubular body has a cross section of about 8 mm, and the electric motor is configured to generate power that is at least sufficient to move the hollow cylinder under mains pressure of between about 0 bar and about 15 bar, and a power of between 40 Newton and 100 Newton.

7. The mixer group according to claim 1 wherein the axial inlet has an inner diameter of about 14 mm, and the hollow cylinder has a section of about 13.9 mm.

8. The mixer group according to claim 1, further comprising a second electric motor configured for actuating a second hollow cylinder, slidable in a second tubular body, each of the electric motors having a shaft thereon and being suitable for the adjustment, respectively, of cold and hot water entering respective axial inlets, flowing into a mixing chamber of the mixer group, in fluid communication with the at least one radial outlet of the tubular body and at least one additional radial outlet of the second tubular body.

9. The mixer group according to claim 8 wherein the electric motors are linear actuation electric motors, arranged outside from the single-body, hydraulically insulated from the mixing chamber, and configured to reduce an interaxial distance between the respective shafts.

10. The mixer group according to claim 9 wherein the interaxial distance is shorter than or equal to about 30 mm.

11. The mixer group according to claim 8, further comprising a substantially boxed body made from insulating material, comprising the electric motors and the single-body, equipped with a face having respective openings for the inlets, an opposite face and a respective double bottom between which an electronic card is situated for driving the electric motors, a lateral face equipped with a respective opening for the outlet of the single-body, and a removable cover giving access to a hydraulically insulated seat which receives a power supply for the electronic card and the electric motors.

12. The mixer group according to claim 11 wherein the hydraulically insulated seat is preformed for receiving batteries.

13. The mixer group according to claim 12 wherein the batteries comprise 5 AAA batteries.

14. The mixer group according to claim 11 wherein the double bottom comprises at least one slot through which electric connections pass between the electronic card and, respectively, the power supply and the electric motors, and a layer of silicon resin insulating the electronic card as a protection from humidity.

15. The mixer group according to claim 11 wherein the substantially boxed body has dimensions that are smaller than or equal to 70 mm×80 mm×50 mm.

16. A mixer group comprising:
a hollow cylinder;
a tubular body that forms a sliding seat of the hollow cylinder, the tubular body including an axial inlet and at least one radial outlet for the water;
a first electric motor configured for actuating the hollow cylinder;
a lid for an end opposite the inlet of the tubular body, defining an extension of the sliding seat;
an annular gasket between the tubular body and the lid, the annular gasket comprising an elastically deformable tab that projects in the extension, in open flow conditions, or is deformed against the hollow cylinder, to close the flow, when the hollow cylinder engages with the extension;
a second electric motor configured for actuating a second hollow cylinder, slidable in a second tubular body, the first and second electric motors being suitable for the adjustment, respectively, of cold and hot water entering respective axial inlets, flowing into a mixing chamber of the mixer, in fluid communication with the radial outlets of the tubular bodies; and
a substantially boxed body made from insulating material, the substantially boxed body including:
the first and second electric motors;
a face having respective openings for the inlets;
an opposite face and a respective double bottom between which an electronic card is situated configured for driving the first and second electric motors;
a lateral face equipped with a respective opening for a water outlet in fluid communication with the at least one radial outlet; and
a removable cover giving access to a hydraulically insulated seat which receives a power supply for the electronic card and the first and second electric motors.

17. The mixer group according to claim 16 wherein the hydraulically insulated seat is preformed for receiving batteries.

18. The mixer group according to claim 17 wherein the hydraulically insulated seat includes 5 AAA batteries.

19. The mixer group according to claim 16 wherein the double bottom includes at least one slot through which electric connections pass between the electronic card and, respectively, the power supply and the electric motors, and a layer of silicon resin insulating the electronic card as a protection from humidity.

20. The mixer group according to claim 16 wherein the substantially boxed body has dimensions that are smaller than or equal to 70 mm×80 mm×50 mm.

* * * * *